US010153549B2

(12) United States Patent
Robinson et al.

(10) Patent No.: US 10,153,549 B2
(45) Date of Patent: Dec. 11, 2018

(54) CORRELATED FANBEAM EXTRUDER

(71) Applicant: Raytheon Company, Waltham, MA (US)

(72) Inventors: Ian S. Robinson, Redondo Beach, CA (US); Anton Horvath, Santa Ana, CA (US); Bradley A. Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 365 days.

(21) Appl. No.: 15/062,789

(22) Filed: Mar. 7, 2016

(65) Prior Publication Data

US 2017/0256855 A1    Sep. 7, 2017

(51) Int. Cl.

| *H01Q 3/34* | (2006.01) |
|---|---|
| *G01S 3/32* | (2006.01) |
| *G01S 7/02* | (2006.01) |
| *H01Q 3/24* | (2006.01) |
| *H01Q 3/26* | (2006.01) |
| *H01Q 21/00* | (2006.01) |

(Continued)

(52) U.S. Cl.
CPC .......... *H01Q 3/34* (2013.01); *G01S 3/32* (2013.01); *G01S 7/021* (2013.01); *H01Q 3/24* (2013.01); *H01Q 3/2682* (2013.01); *H01Q 21/00* (2013.01); *H01Q 21/061* (2013.01); *H01Q 25/002* (2013.01)

(58) Field of Classification Search
CPC ........ H01Q 3/34; H01Q 21/00; H01Q 25/002; G01S 3/32; G01S 7/021

USPC ......................................................... 342/371
See application file for complete search history.

(56) References Cited

U.S. PATENT DOCUMENTS

| 3,191,170 A | * | 6/1965 | Lustig ..................... G01S 1/02 |
| | | | 342/191 |
| 3,364,484 A | * | 1/1968 | Best ..................... G01S 13/426 |
| | | | 342/140 |

(Continued)

FOREIGN PATENT DOCUMENTS

| GB | 1305480 A | * | 1/1973 | ............... G01S 3/42 |
| WO | 2004008575 A1 | | 1/2004 | |

OTHER PUBLICATIONS

Herbert M. Aumann, "A Pattern Synthesis Technique for Multiplicative Arrays," PIERS Proceedings, Cambridge, USA, Jul. 5-8, 2010, pp. 864-867.

(Continued)

*Primary Examiner* — Harry K Liu
(74) *Attorney, Agent, or Firm* — Burns & Levinson, LLP; Joseph M. Maraia

(57) ABSTRACT

Antenna systems and methods of detecting RF signals received from a field of view (FOV) are presented, employing intersecting fan beam pluralities formed by associated columns or rows of antenna elements and cross-correlation of components of the received radiation from the fan beam pluralities. The intersecting fan beams pluralities form pencil-like beams persistently spanning the FOV as desired. Angle(s) of arrival and frequency channels of incident RF signals may be determined through power estimation, ranking and filtering, and/or frequency channelization techniques. Higher sensitivity beams may be cued to more accurately characterize the incident signals.

22 Claims, 11 Drawing Sheets

(51) Int. Cl.
  *H01Q 21/06*     (2006.01)
  *H01Q 25/00*     (2006.01)

(56)         References Cited

U.S. PATENT DOCUMENTS

| | | | |
|---|---|---|---|
| 3,423,752 A * | 1/1969 | Schwartz | H01Q 25/004 |
| | | | 342/107 |
| 4,929,951 A * | 5/1990 | Small | G01S 13/89 |
| | | | 250/334 |
| 5,053,781 A | 10/1991 | Milman | |
| 5,359,334 A * | 10/1994 | Gutman | G01S 1/56 |
| | | | 342/158 |
| 5,784,031 A | 7/1998 | Weiss et al. | |
| 6,104,343 A | 8/2000 | Brookner et al. | |
| 6,377,213 B1 | 4/2002 | Odachi et al. | |
| 6,771,218 B1 | 8/2004 | Lalezari et al. | |
| 7,336,232 B1 | 2/2008 | Lee et al. | |
| 7,460,063 B2 | 12/2008 | De Maagt et al. | |
| 8,248,298 B2 | 8/2012 | Lalezari | |
| 9,642,167 B1 * | 5/2017 | Snyder | H04W 76/007 |
| 2006/0058672 A1 * | 3/2006 | Klepper | B06B 1/0622 |
| | | | 600/447 |
| 2007/0001897 A1 * | 1/2007 | Alland | G01S 7/288 |
| | | | 342/70 |
| 2009/0079619 A1 | 3/2009 | Archer et al. | |
| 2015/0077290 A1 | 3/2015 | Veysoglu et al. | |
| 2016/0007315 A1 * | 1/2016 | Lundgreen | G01S 3/46 |
| | | | 455/67.11 |
| 2017/0086080 A1 * | 3/2017 | Sun | H04L 67/104 |

OTHER PUBLICATIONS

International Search Report and Written Opinion from related PCT Application No. PCT/US2016/055739 dated Jan. 13, 2017.
Haykin et al., "Digital Baseband Processing of a Mills' Cross Array Antenna". Communication Research Laboratory, Faculty of Engineering, McMaster University, pp. 6-10, 1979.
Slattery et al., "Use of Mills cross receiving arrays in radar systems", Proc. IEE, vol. 113, No. 11 , Nov. 1966.
MacPhie et al., "A Mills Cross Multiplicative Array with the Power Pattern of a Conventional Planar Array" Electrical and Computer Engineering Department, University of Waterloo, Waterloo, Ontario, Canada N2L3G1, pp. 5961-5964, 2007.

* cited by examiner

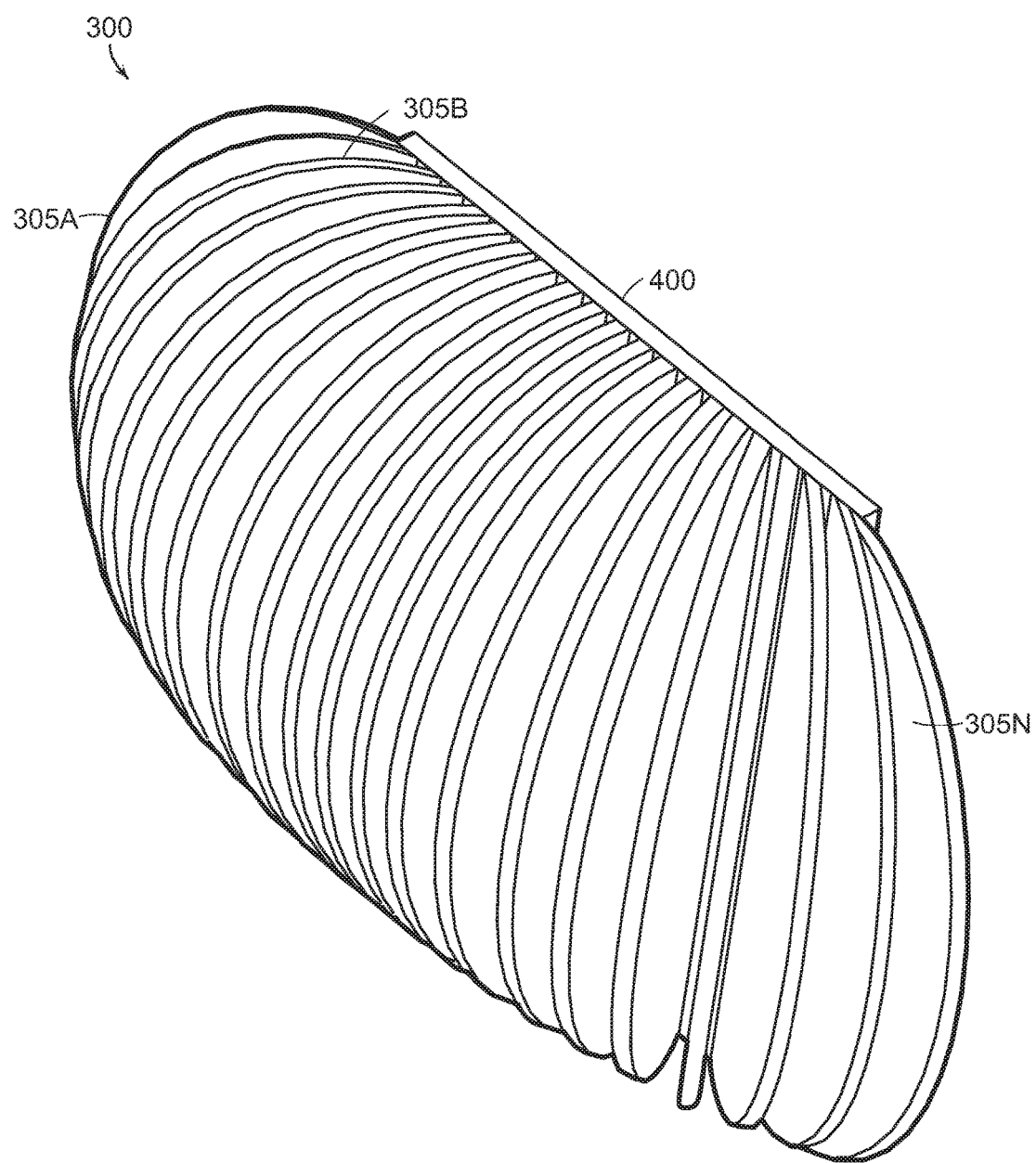

CORRELATED FANBEAM EXTRUDER

U.S. GOVERNMENT INTEREST

There is no U.S. Government ownership or other interest in the invention(s) described and claimed herein.

BACKGROUND

Many RF antenna systems are required to receive signals over a wide field of view (FOV). Yet, if the angle of arrival in elevation and azimuth is unknown a priori then emissions may go undetected. Electronically scanned antenna arrays can provide receive beams across a FOV, but there is a cost and complexity to the processing and data transfer for each beam formed. Further, many RF systems can receive signals over a wide range of frequencies, but it is computationally expensive to detect signals over a wide range. Also, if the angular extent of beams are large, then there may be many signals received in each beam. To avoid interference of unwanted signals and maximize sensitivity, it is desirable to create each beam using all the elements in an array, creating one or more full aperture beams, which have the smallest angular extent (highest angular resolution) of any beam created by that array.

Filling the FOV of an array with high resolution, full aperture beams requires the received signal to be sampled at each element, and incurs a cost proportional to the number of elements receiving the signal and bandwidth of the received signal. Some narrowband systems form large numbers of high resolution beams using exceptional, brute force beamforming computers. Wideband systems, however, have either employed beams with little or no angular resolution, involving few elements, having relatively low sensitivity and a high susceptibility to interference, or small numbers of high resolution beams pointed at angles within the FOV (known to contain signals). Wideband digital antennas can generate significant amounts of data, e.g., on the order of 10-100 Gbit/sec per antenna element, requiring either extensive processing near the antenna elements or high power transport electronics for the data. To form a beam, data from the respective elements must be time delayed (typically requiring interpolation), so the data arriving from any specified angle adds coherently when the samples are combined. To reduce computational or transport complexity, the data can be filtered to a reduced bandwidth and or groups of elements may be combined before transport. Filtering or combining the data limits what can be detected in later processing, as combined elements (sub-arrays) receive signals from only a portion of the FOV.

Thus, what are needed are apparatus and methods for determining where in angle, and ideally where in frequency, signals are located so that full aperture beams can be formed at those angles and received data filtered to retain only portions of the spectrum where signals are located. Optimally, such systems would use the same equipment otherwise used in the array and could ideally fill a FOR with beams that can detect and locate the angle and frequency of incident signals, and cue full(er) sensitivity beams for interrogating detected signals for additional detail and characterization.

BRIEF SUMMARY

Implementations described herein are generally related to RF signal detection and processing using beamforming and cross-correlation principles in angle of arrival (AoA) measurements. Electronically scanned arrays may form full aperture beams (beams formed by combining all elements in the array, beams that have the best angular resolution achievable with a given array) that can be steered within the field of view (FOV), the angular region that the antenna can access instantaneously with beam. A field of regard (FOR) is, generally, the ensemble of angular regions that the antenna can access at different times, such as if it were mechanically re-pointed or if it used sub-arrays that had to be re-pointed at different times. Full aperture "pencil beams" can provide highly accurate (e.g., better than 1° with practical receiver performance) AoA measurements in both azimuth and elevation (i.e., accuracy being a function of aperture size). However, there is a significant cost in power and hardware to form multiple full aperture beams simultaneously, the cost increasing with received bandwidth. Implementations described herein offer a novel survey mode for array antennas, which enables reception across the FOV with multiple beams each having full angular resolution, very wide bandwidth beams at slightly reduced sensitivity, in order to detect any signals incident at effectively any AoA and with the ability to determine where in the spectrum the signal exists. This data, optionally, may be used to cue formation of full aperture beams with full sensitivity in the detected AoA. The cued beams may be formed using other antenna, or may comprise different beams formed by the same antenna, when switched from the survey mode to a focused mode.

One implementation provides systems and methods of detecting RF signals received from a field of view (FOV) using a first fan beam plurality and a second fan beam plurality intersecting the first fan beam plurality. Each of the fan beams may originate from an associated column or row of antenna elements of an array antenna and point to a different angle in the FOV from its associated column or row with respect to the other fan beams in its respective fan beam plurality. The received radiation from the first fan beam plurality and the second fan beam plurality may be cross-correlated, with or without signal triage processes. The intersecting portions of the first fan beam plurality and second fan beam plurality may form a plurality of pencil-like beams. This plurality of intersecting regions may persistently span the FOV.

In another implementation, the plurality of pencil beams may be formed with the full angular resolution of the array antenna.

In another implementation, the array antenna may comprise an orthogonal array antenna. At least one fan beam may be formed from a subarray of multiple columns or of multiple rows, respectively, of the orthogonal array.

In yet another implementation, an amount of signal power present at the intersections of the fan beam pluralities from one or more incident signals may be estimated from the cross-correlation. The amount of estimated power at a determined angle of arrival may cue the formation of one or more beams of higher sensitivity than the intersecting fan beams at the determined angle(s) of arrival of the incident signal(s). The incident signal(s) may be characterized using the higher sensitivity beam(s). In some implementations, the higher sensitivity beam(s) may be formed by the same array antenna, but now operating in a focused mode rather than a survey mode. This cueing may be the result of ranking and/or filtering the estimates of incident signal power with a respective azimuth and elevation of each of the associated fan beam pluralities intersections.

In other implementations, one or more signal triage operations may be performed, such as eliminating prior to cross-correlation fan beams from the first fan beam plurality and second fan beam plurality containing power below a threshold power. Another possible operation may include, prior to cross-correlation, channelizing the fan beams into frequency channels, and selecting for cross-correlation the frequency channelized channels above a threshold power. In another embodiment, prior to cross-correlation, a fast Fourier transform may be applied to the fan beams, and frequencies with coefficients above a threshold are selected for cross-correlation, wherein the cross-correlation is performed in frequency space by multiplying like complex coefficients.

In certain embodiments, at least one fan beam of the first fan beam plurality or the second fan beam plurality has a peak angle distinct from that of the other fan beams in its respective plurality.

In other implementations, cross-correlating the intersecting fan beams may involve initially determining whether intersecting portions of the first fan beam plurality and the second fan beam plurality indicates a potential incident signal, then channelize each of the fan beams into multiple frequency channels, and cross-correlating like frequency channels in order to identify in which the frequency channel signals are present.

In another implementation, systems and methods of operating a digital beam-forming array antenna are provided. In a survey mode, the respective angle of arrival of at least one incident signal may be determined using a plurality of persistent full bandwidth beams of full angular resolution formed in a FOV by the array antenna. Then, in a full aperture focused mode, one or more beams having higher sensitivity than the survey mode beams may be formed with the array antenna and electronically steered toward the determined angle(s) of arrival. In the survey mode, the presence of the at least one incident signal above a threshold power level may be determined.

BRIEF DESCRIPTION OF THE DRAWING

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

FIG. 3 is a side view illustration of a horizontal fan beam pattern formed by an array antenna embodiment;

DETAILED DESCRIPTION

Figure 1:
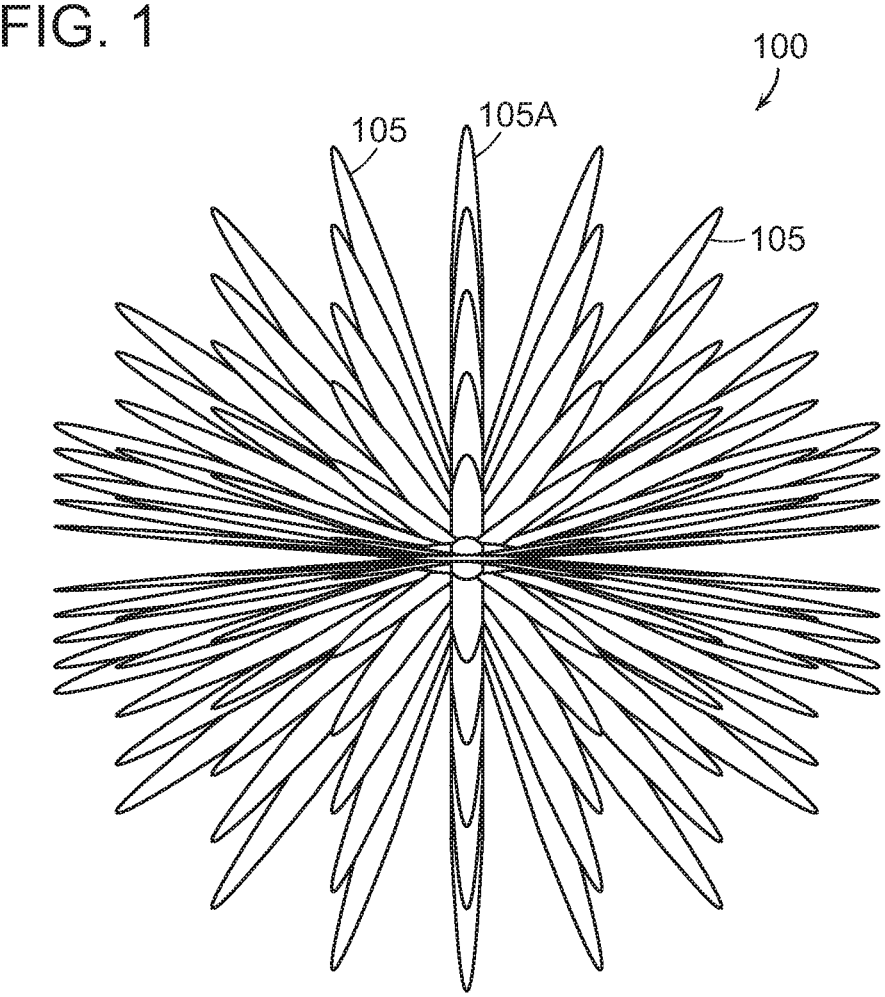
FIG. 1 is an illustration of a pencil-like beam pattern formed by an array antenna implementation, viewed directly in front of the antenna, along its boresight.

A method and an apparatus for detecting RF signals received from a FOV are disclosed. In the following description, numerous specific details are set forth. In the other instances, details well known to those skilled in the art may not be set out so as not to obscure the invention. It will be apparent to those skilled in the art in the view of this disclosure that modifications, substitutions and/or changes may be made without departing from the scope and spirit of the invention. In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

The implementations provide improved methods, antennas, and systems that embody a lower cost approach to real-time signal acquisition. The implementations may be used in many radar, electronic warfare, communications and multifunction RF applications.

In broad terms, the implementations persistently cover a wide FOV with high gain, high angular resolution beams that receive over a very wide band of desired frequencies. This may be accomplished by cross-correlating the signals received from pluralities of intersecting fan beams. Persistent coverage may involve filling the FOV with beams that can detect and locate one or more angles of arrival (AoA) and frequency (or frequencies) associated with one or more incident signals. In some implementations, this detection is employed as a survey mode that cues beams having greater (e.g., full, etc.) sensitivity in a focus mode to confirm the detection, and to further characterize the signals (e.g., target identification and/or tracking, etc.)

Figure 10:
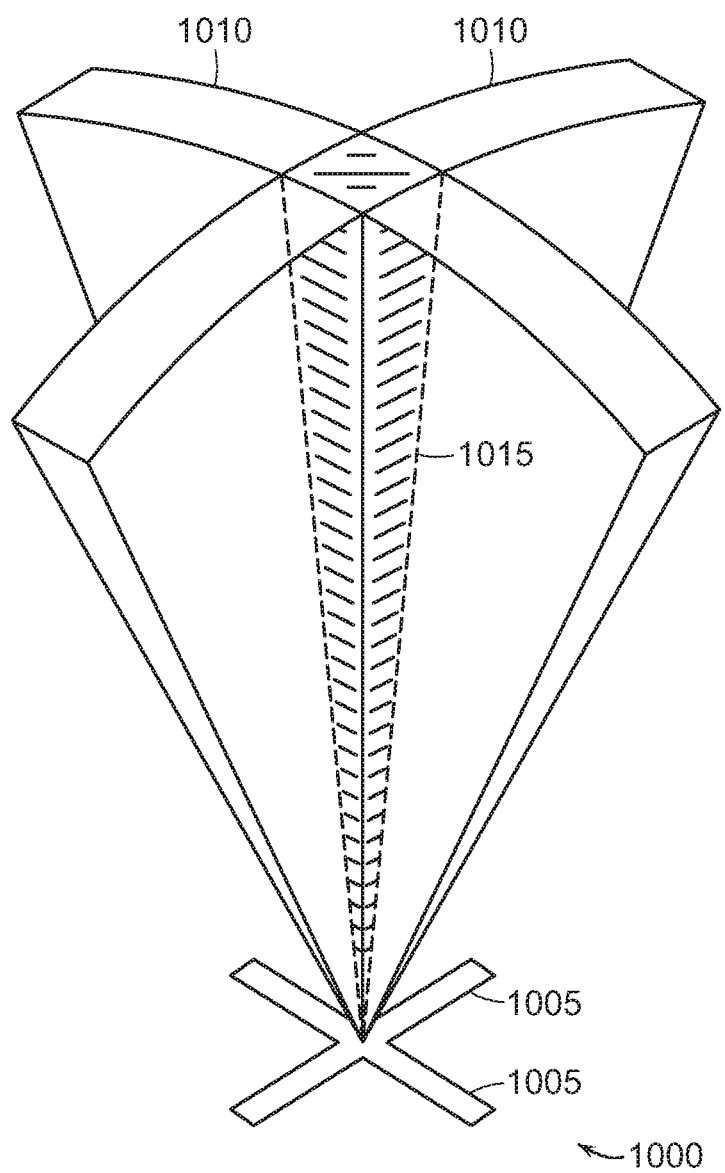
FIG. 10 is an illustration of a radiation pattern formed by a prior art configuration of a single pair of linear antenna arrays.

With reference to FIG. 10, an antenna 1000 designed with a single pair of orthogonal linear arrays 1005 known as the Mills Cross was pioneered in radio astronomy in the 1950s, and involved the use of multiplicative signal processing of intersecting receive beams 1010 to achieve a desired high angular resolution in a single known direction, i.e., in the direction of a pencil-like beam 1015. See "Use of Mills Cross Receiving Arrays in Radar Systems", B. R. Slattery et al., Proc. of IEE, Vol. 113, No. 11, November 1966. The Mills Cross antenna array 1000 is a "sparse" antenna array developed to avoid using more costly filled antenna arrays. See "A Mills Cross Multiplicative Array with the Power Pattern of a Conventional Planar Array", Robert H. MacPhie, Antennas and Propagation Society International Symposium, IEEE 2007, pp. 5961-5964.

The implementations disclosed provide superior capabilities and performance by cross-correlating the signals received by pluralities, or sets, of persistently intersecting fan beams formed by associated columns or rows of a filled array antenna that form a multitude of pencil-like beams of high angular resolution across the full FOV of the array antenna. Then, optionally, the filled array may be used to form full aperture beams cued by the measurements of the intersecting fan beams.

Radiation Patterns

Figure 2A:
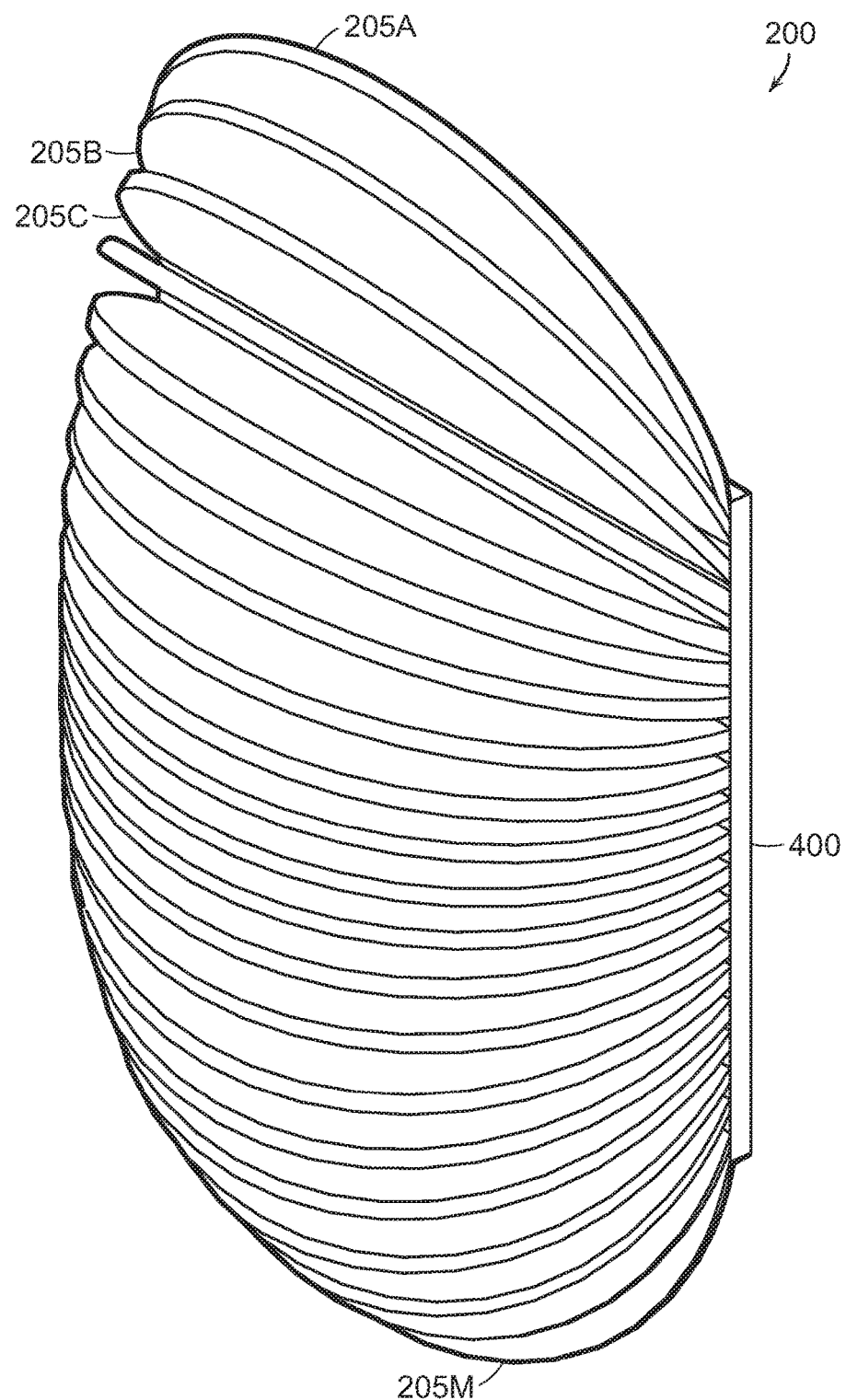
FIGS. 2A and 2B are side view illustrations of a vertical fan beam pattern formed by an array antenna embodiment.
Figure 2B:
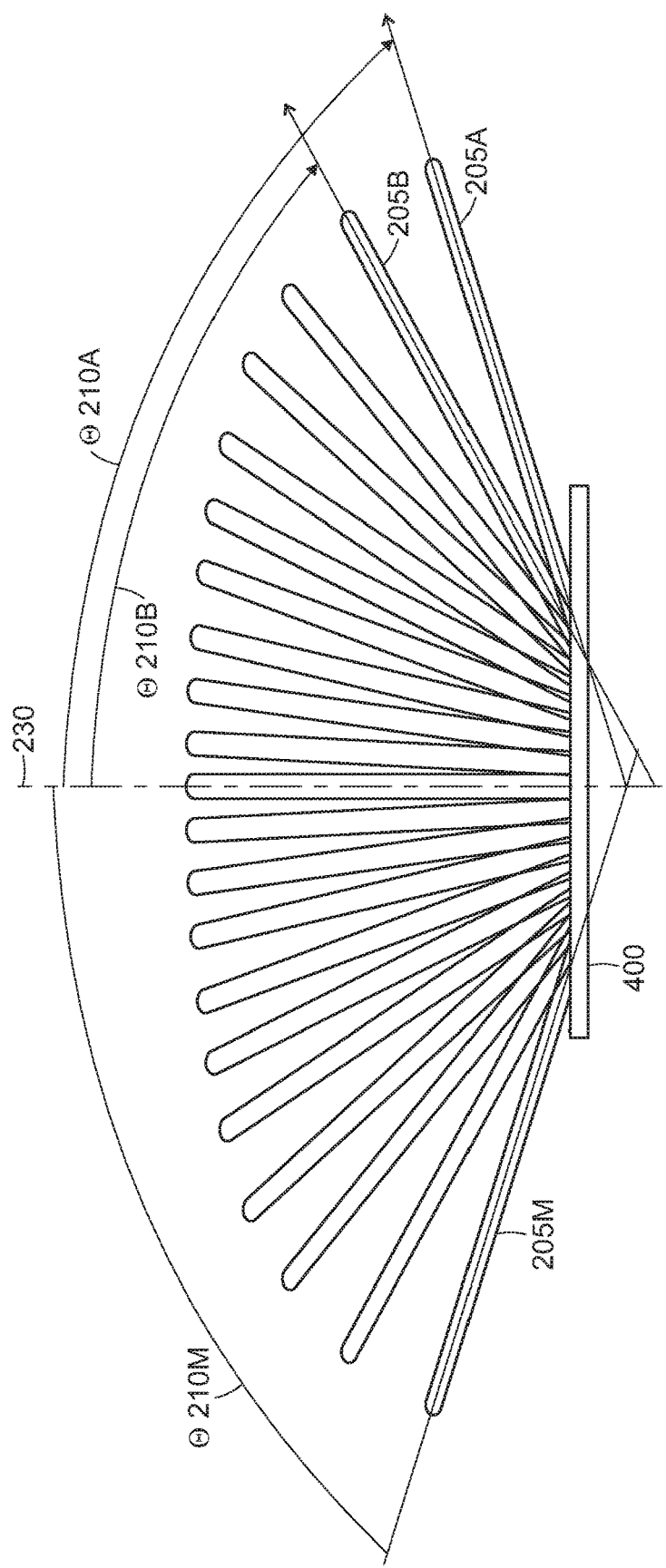

FIG. 1 is a plot illustrating an example radiation pattern 100, viewed directly facing an antenna for generating the pattern, that may be produced by two intersecting pluralities, or sets, of fan beams. FIGS. 2A, 2B and 3 are plots illustrating first and second fan beam patterns 200, 300, respectively, each produced by an antenna 400, and whose intersection may form a radiation pattern similar to that of radiation pattern 100. As is more clearly illustrated in FIG. 2B, each elevation fan beam (e.g., 205A) of the plurality of fan beams 205A-205M may be pointing at a different peak angle θ 210A into the FOV than the peak angle θ 210B associated with any other elevation fan beam 205B in its associated fan beam pattern 200. The same may be true for each azimuth fan beam 305A-305N shown in FIG. 3. Each fan beam is full angular resolution in one axis, with narrow angular extent, and omnidirectional in the other direction.

Cross-correlation processing (described in detail below) is applied to RF signals received from each respective M elevation and N azimuth fan beams. The cross-correlation preserves signals in the overlap regions only, fan beams 205A-205M of fan beam pattern 200 with N fan beams 305A-305N of fan beam pattern 300 causes radiation pattern 100 to comprise M×N pencil beams, the overlap region having the same angular extent as a full aperture pencil beam 105. In some implementations, a central row or column 105A of pencil beams 105 may be formed, if an associated fan beam is formed in the plane of the central row or column 105A that is then cross-correlated with a plurality of intersecting fan beams. The pencil beams 105 persistently fill a wide FOV with high angular resolution beams in both azimuth and elevation. The extent of a fan beam in the narrow direction is inversely proportional to the electrical length of the aperture or array.

FIGS. 1-3 illustrate radiation patterns with separation between fan beams in each fan beam plurality, and with the fan beams appearing only above the plane of the array antenna. These depictions are merely for the purpose of clarity. First, practicing antenna designers will readily appreciate that all antennas have side lobes and/or back lobes, which may be much smaller (e.g., as a result of antenna shielding, etc.) than the fan beams used in the embodiments. If it were desirable to survey a FOV including space 'behind' the depicted array antenna, a second array antenna oppositely disposed could be employed. Secondly, in practice, the beam shapes are a function of frequency. For wideband systems the beams formed at lower frequencies may overlap, perhaps significantly. Providing wider fan beams than depicted, wider "pencil" beams at the intersections of pairs of the azimuth and elevation fan beams, which in turn would desirably occupy a greater space in the FOV being surveyed.

Figure 4:
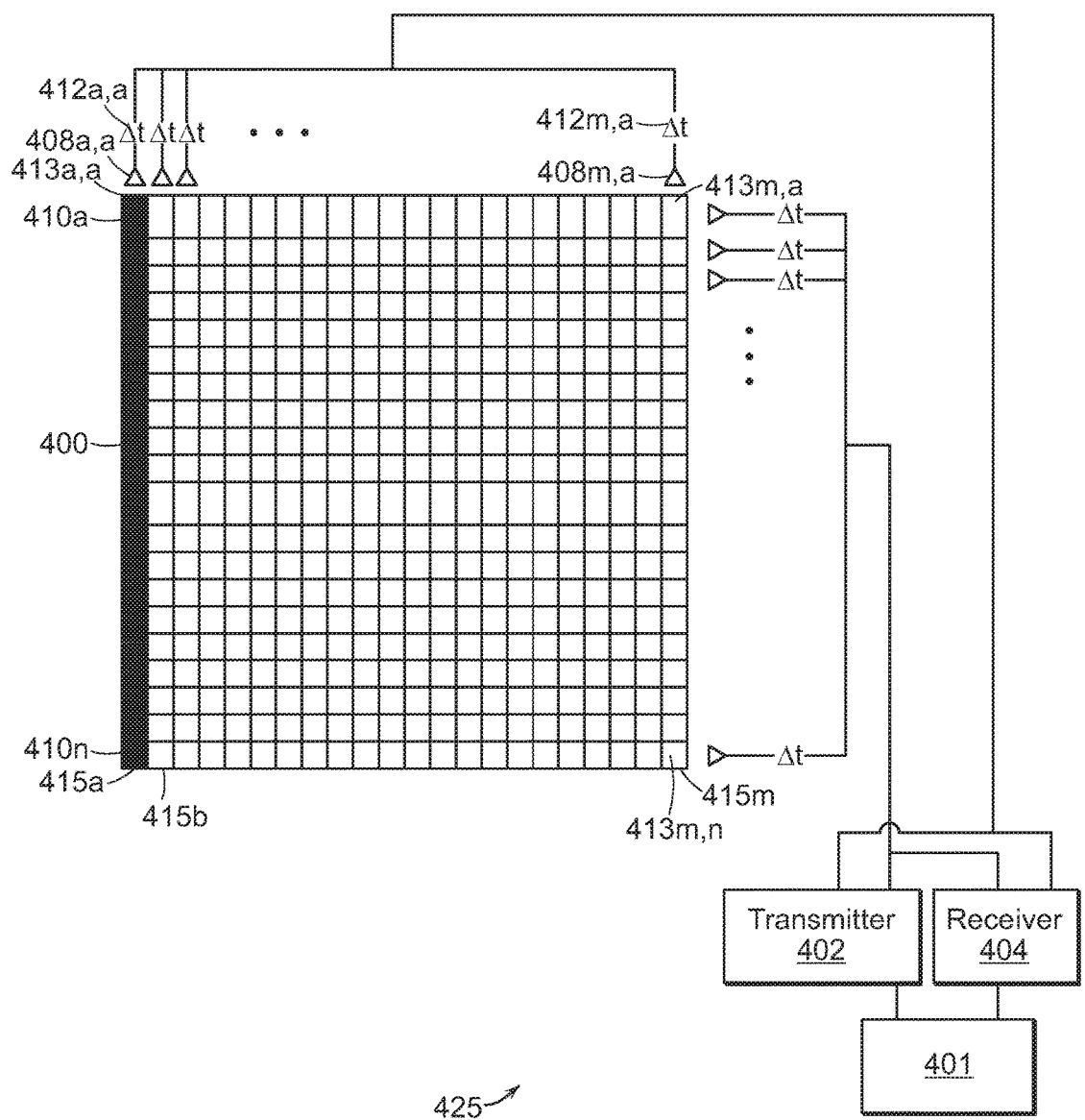
FIG. 4 is an illustration of an orthogonal array antenna and block diagram of associated antenna system components.

With reference to FIG. 4, an exemplary array antenna 400 that may be used to form a radiation pattern similar to that of radiation pattern 100 is illustrated as part of a wideband digital antenna system 425 for transmitting and receiving RF signals. For the purpose of clarity, fewer pencil beams 105 are shown in FIG. 1 than may be produced by array antenna 400. Antenna 400 may be a directive planar array antenna comprised of a plurality of individual antenna elements $413_{m,n}$ orthogonally arranged in N rows 410 and M columns 415. Orthogonal orientation of the rows 410 and columns 415 is beneficial, in that undesirable overlap of any side lobe radiation patterns may be minimized. Antenna system 425 may comprise array antenna 400, a transmitter 402 (optional), a receiver 404, and signal processor and controller 407. Array antenna 400 receives a signal (e.g., reflected or emitted from a given object or target), and feeds the received signal to receiver 404 and to signal processor and controller 407. The received signal data are then processed to determine if the result of the cross-correlation is larger than a threshhold (e.g., user selected or previously defined, fixed or dynamically determined, etc.), indicating the presence of a signal. If there is a signal present, the system records its angle of arrival (AoA) with respect to antenna 400, by virtue of it being located within the small overlap angular region, and optionally a frequency of the received signal. In some embodiments, the determined AoA and frequency are used to cue beams having higher sensitivity, which may also be generated by array antenna 400.

A two-dimensional planar array antenna having a rectangular aperture can produce pluralities of fan beams. Each of rows 410a-410n and columns 415a-415m may generate an associated fan beam 305A-305N, 205A-205M having a shape and direction determined by the relative phases and amplitudes of the excitation signal associated with the individual antenna elements $413_{m,n}$ in that row or column. Consider, for example, the M antenna elements $413_{a,a}$ through $413_{m,a}$ comprising first row 410a in array antenna 400. Each of antenna elements $413_{a,a}$-$413_{m,a}$ may include an associated receiver (or radiator) $408_{a,a}$-$408_{m,a}$ and a time shifter $412_{a,a}$-$412_{m,a}$. By properly introducing time delays using time shift processing $412_{a,a}$-$412_{m,a}$ to the signals received at receivers (or radiators) $408_{a,a}$-$408_{m,a}$ (i.e., a subarray) that are each greater than that of the adjacent element, a fan beam wavefront may be formed at a desired beam angle θ relative to a boresight axis orthogonal to the first row 410a. The direction of maximum sensitivity of the produced radiation pattern (e.g, fan beam) is at a beam angle θ related to the time difference Δt between adjacent antenna elements $413_{m,n}$ governed by the formula $$\Delta t = \frac{d \sin \theta}{c},$$

where d is the space between each of the antenna elements 406a-406m and c is the speed of light.

Figure 6:
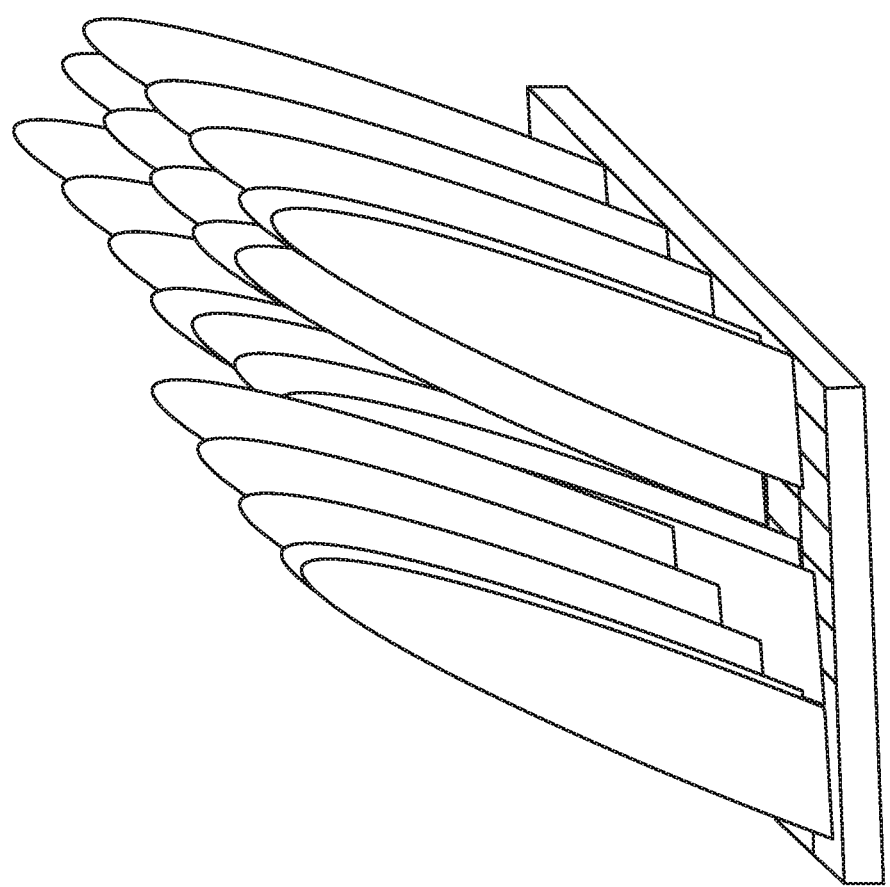
FIG. 6 is a side illustration of a radiation pattern of pencil-like beams directed at a selected angle of arrival of incident radiation in an exemplary focused mode.

With additional reference to FIG. 2B, in some implementations, the antenna elements of each column, e.g. column 415b, may have time differences such that a fan beam 205B is formed having a beam angle θ 210B that differs from the angles (e.g., angle θ 210A) of the fan beams formed by the other columns (e.g., column 415a) of antenna elements $413_{a,a}$-$413_{m,a}$. In some implementations, the angles θ 210A-210M may be chosen to be evenly spaced in the FOV in order to provide maximum spatial extent of persistent pencil beams in azimuth and elevation (albeit at a lower sensitivity than a full beam composed from the full antenna array 400 or multiple rows and columns of the array 400.) In some implementations, after an AoA of an incident signal is determined in azimuth and elevation, the operation of array antenna 400 may switch to a focused mode by adjusting the time delays introduced by time shifters 412 such that many rows and columns, perhaps all rows and columns, are used to create a beam in that determined AoA direction with greater sensitivity (proportional to the number of elements used to form the beam.) FIG. 6 illustrates an example radiation pattern in which multiple beams are directed toward a determined AoA of detected incident RF signal in this manner. As noted, however, it may be preferable to coherently add the array antenna elements to form a single beam of full angular resolution in the determined AoA, which would have a greater sensitivity than distinct multiple beams. Those of ordinary skill in the art will recognize that other radiation patterns may be formed using the array antenna 400 with similar time shift and coherent addition techniques.

The array antenna 400 is illustrated in FIG. 4 as having a rectangular aperture. The spacing of the antenna elements $413_{m,n}$ in the array lattice may be $\lambda/2$, making the length of the array aperture $10\lambda$, with $\lambda$, comprising the wavelength corresponding to the shortest wavelength of operation of the array. It will be appreciated by those skilled in the art that other shapes may be used, including non-orthogonal and/or non-planar configurations such as arbitrarily shaped planar array antennas, conical, cylindrical, etc., conformal array antennas. Also, those of ordinary skill in the art will readily appreciate that antenna beams having non-pencil shapes may also be used, and may be formed using well-known techniques such as by inclusion of attenuators into appropriate locations in a feed circuit, for example.

Incident Signal Processing Implementations

Figure 5:
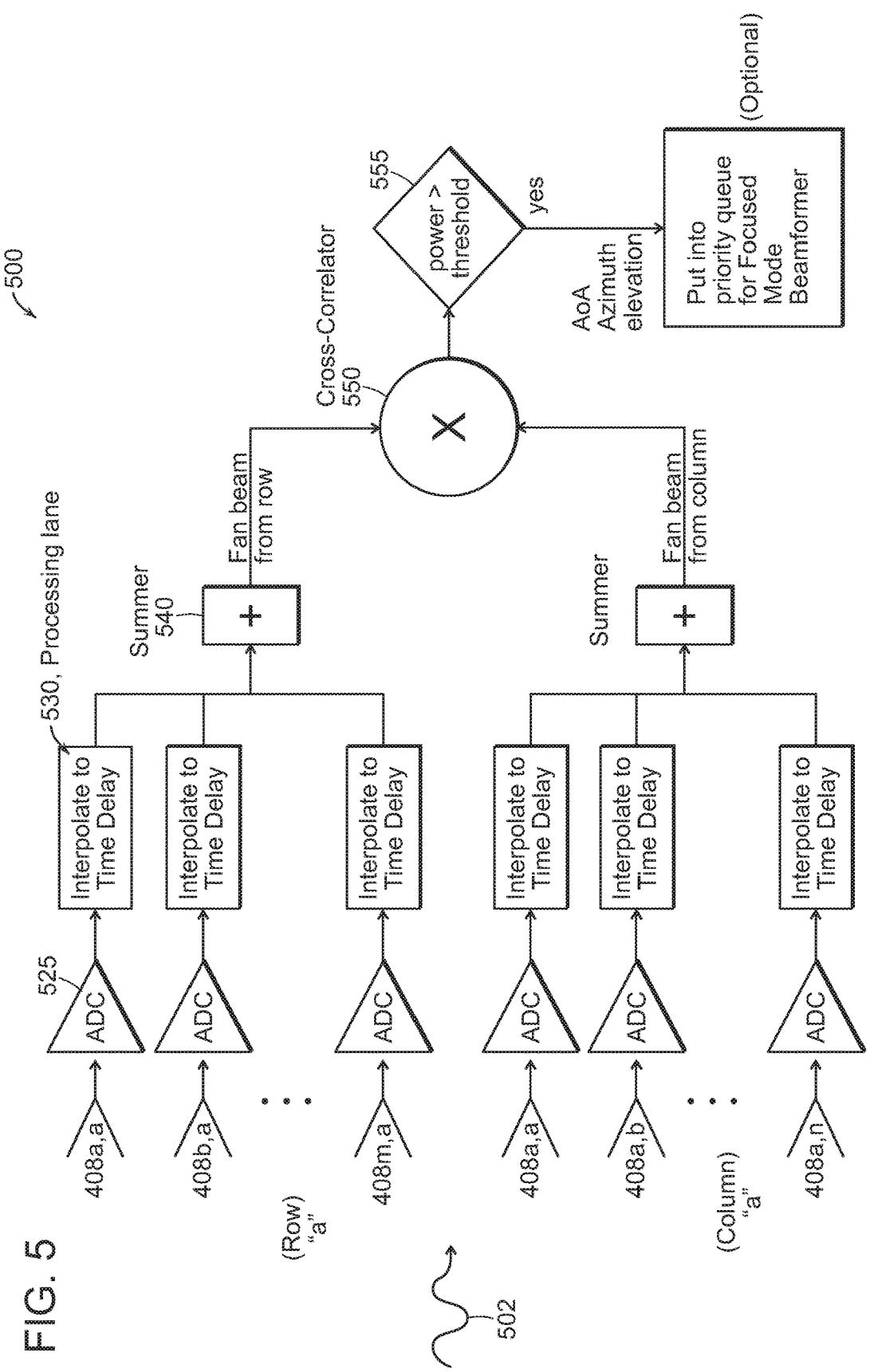
FIG. 5 is a block diagram of an exemplary signal processing architecture that may be used in the embodiments.

FIG. 5 illustrates an exemplary RF signal processing architecture 500 that directly samples the received wideband RF signals 502. An alternative embodiment may incorporate down-conversion capability prior to ADC sampling. For wideband applications, direct sampling would provide wider instantaneous frequency coverage, and also remove the need for analog delays.

The RF signals 502 may be received at receivers $408_{m,n}$ associated with each antenna element $413_{m,n}$ in rows 410a-410n and columns 415a-415m, sampled by a respective analog to digital converter (ADC) 525, and processed by a respective signal processing lane 530 to apply a particular digital time delay $\Delta t$ for the specific beam direction being created. Signals received at each antenna element may be processed by a single ADC (though distinct ADCs are illustrated), but two processing lanes, where one processing lane implements time delay for the column fan beam, and the other lane implements time delay for the row fan beam. For example, the signals received at receiver element $408_{a,a}$ may be processed by a single ADC 525, but then are processed by distinct processing lanes associated with the respective row (410a) and column (415a) to which receiver element $408_{a,a}$ belongs. Each signal processing lane 530 may output processed signal data (in real bits or using in-phase/quadrature, I/Q) for an associated antenna element $413_{m,n}$. The time delay $\Delta t$ may be incremented for each antenna element $413_{m,n}$ based on the spacing between each element and a reference location. This signal processing may interpolate the time samples from that element to form digitally time delayed samples using well known formulas for bandpass interpolation. Those of ordinary skill in the art will readily appreciate that beamforming may be accomplished using a number of approaches, of which beamforming using digital time delays is but one example. Time delay processing often involves interpolation, which may sometimes be referred to as fractional delay filtering, and/or may utilize explicit delay devices (i.e., processing lane 530a may include a digital register that holds signals for one or more clock cycles.) This signal processing may include a channelizer which channelizes the signal into narrower frequency channels. When elements of a row or column have been appropriately time delayed to synchronize for a specific AoA, the time series (or one channel thereof) are added in the summer 540 to form the received signal from a fan beam (or one channel thereof).

The fan beam (or one channel thereof) may then be cross-correlated with similar output for each fan beam (or the appropriate channel of same) with which the instant fan beam intersects in the cross-correlator 550. The cross-correlator may apply an additional digital time delay, if needed, to synchronize the timings of the fan beams. The cross-correlator may multiply the data series elements and sum the products, resulting in the power in the cross-correlated beam. The output of correlator 550 has the equivalent angular resolution (pattern multiplication) effect of a two-dimensional full aperture pencil beam at the intersection point of the two fan beams. Due to the use of subarrays, only a fraction of processing computations is required, compared to conventional array antennas. The output of correlator 550 may be fed into a comparator 555 or other component for comparing the cross-correlated output signal data to one or more threshold powers, in order to identify and/or rank incident signals of interest, the AoA (and potentially frequency channel) of has now been determined.

The exemplary signal processing methods may use additional functional components, not included in FIG. 5, such as down converters, frequency bandpass filters, or power threshold filters, etc. As noted above and illustrated in FIG. 4, array antenna 400 may be configured with many lanes of processing; one lane for each antenna element and each channel for the AoA used in calculating the digital time delay. Signal processing lane 530 may apply one or more digital frequency filters (optional) to create one or more channels in addition to digital time delay. Summer 540 may include weighting (optional) and summing of the signal processing lane outputs from all antenna elements in a row or column subarray. Many additional options for adding element outputs may be utilized by those skilled in the art; using more than a single row or column in the sum to increase sensitivity at the cost of reducing the number of angles tested or to use only partial rows and columns to test additional angles, but at reduced sensitivity. If signal processing lane outputs from 530 are channelized, the summing operations may be performed for each channel. If fan beam signals output from 540 from each row and column are channelized, the cross-correlation operation performed by cross-correlator 550 is performed for each like channel. The fan beam signals output from 540 can be filtered by a power thresholding filter, similar to 555, prior to cross-correlation to reduce the number of cross-correlations done, since each fan beam may be cross-correlated with every fan beam in the other direction.

Array antenna 400, in one example, may comprise a 20×20 array of elements $413_{m,n}$ constructed from suitably spaced dipole antenna elements, open-ended waveguides, slots cut in waveguides, printed circuit antenna elements or any other type of antenna element. The antenna elements $413_{m,n}$ may operate in a 1 to 4 GHz frequency band. At 4 GHz, the beams may occupy 6°, so 20 fan beams may cover 120° in the FOR. Signals representing radiation received at each of the antenna elements $413_{m,n}$ may be sampled at 8 Gsamples/second using 5 data bits. Thus, 40 Gbits/sec per element and 16 Tb/second of total data (i.e., 400 times the per element data rate) may need to be processed. These operating parameters and dimensions are merely examples, and others may be used. The number of computations would be a function of # of elements, system operating bandwidth, and ADC bits. Thus, the impracticality of transmitting all data bits to a beamforming computer can be readily appreciated.

Figure 7:
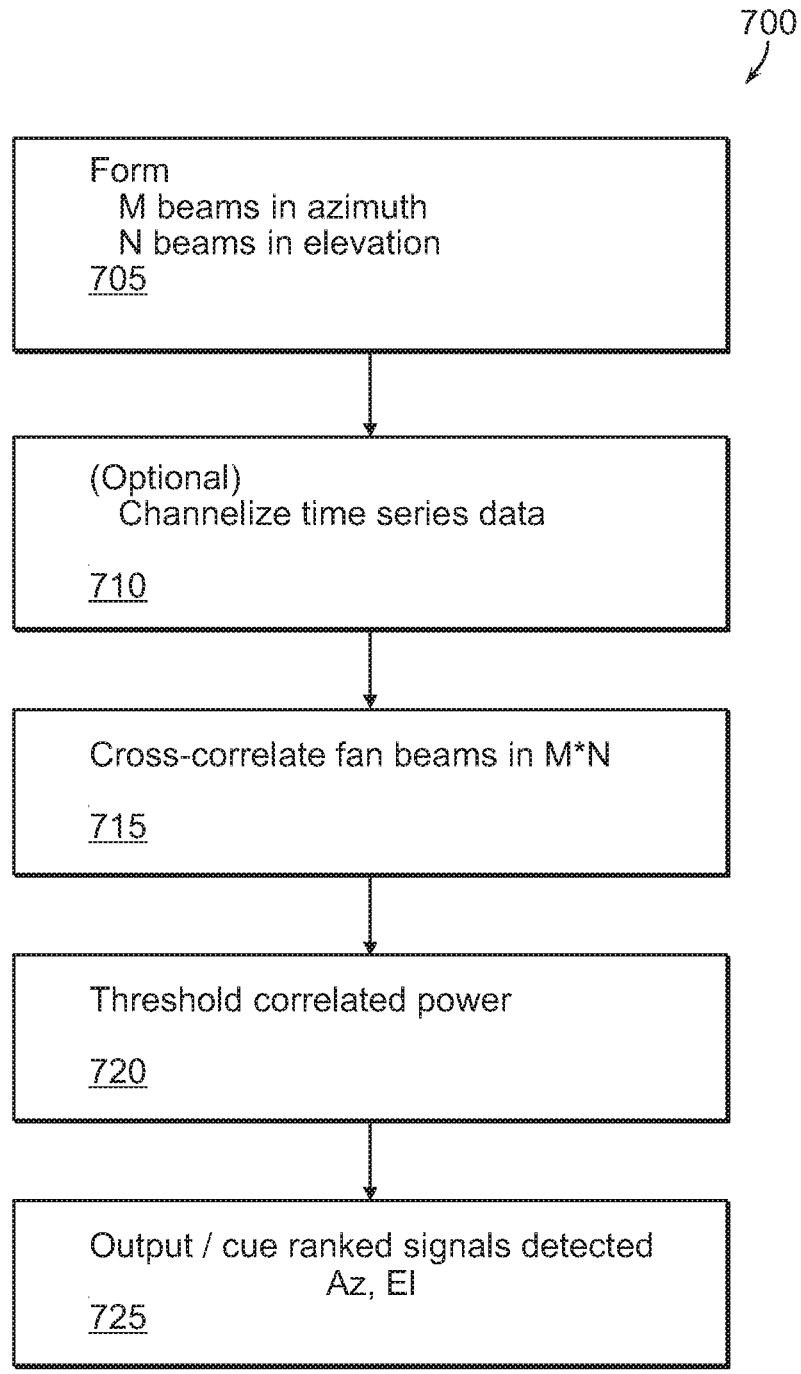
FIG. 7 is a flow diagram for a signal processing method implementation.
Figure 8:
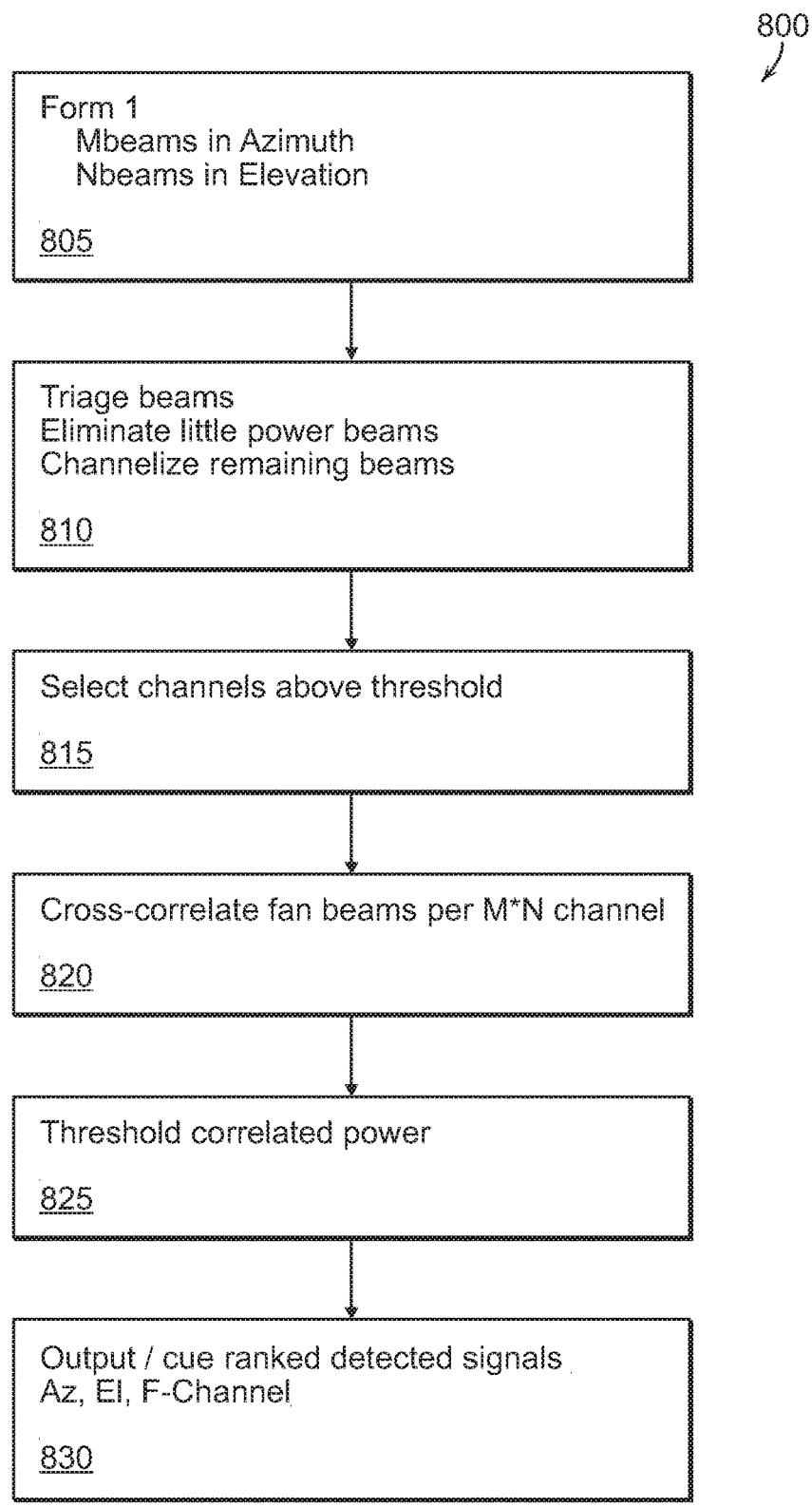
FIG. 8 is a flow diagram for another signal processing method implementation, utilizing channelization of received RF signals for greater detection capability.
Figure 9:
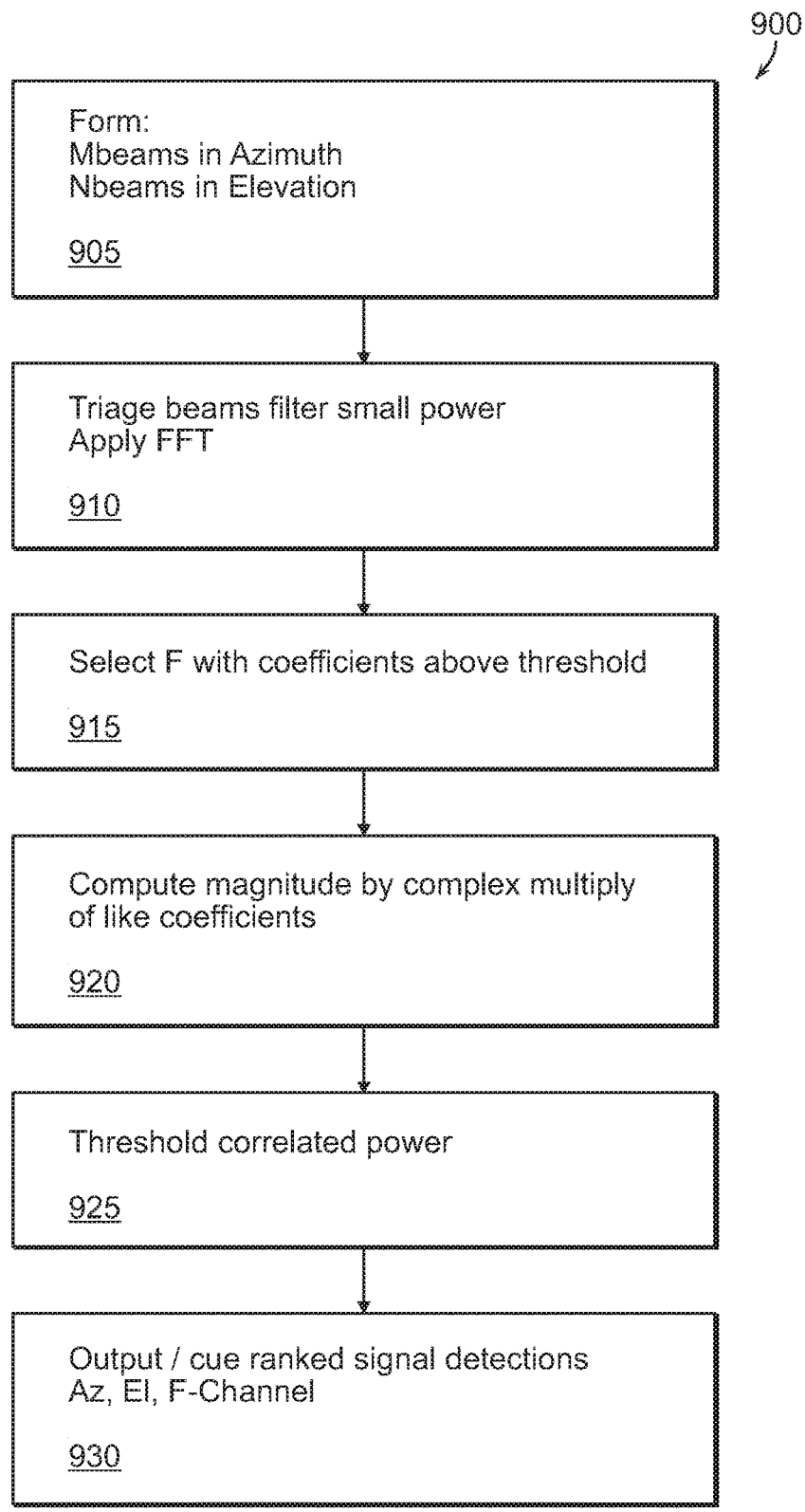
FIG. 9 is a flow diagram for another signal processing method implementation, utilizing fast Fourier Transforms for greater detection capability.

FIGS. 7-9 are flow diagrams illustrating implementations for detecting RF signals received from the FOV, ordered in increasing sensitivity (and associated computational requirements.)

With reference to FIG. 7, an implementation of a method 700 for surveying RF signals incident upon an antenna from a FOV is illustrated. In step 705, intersecting sets of full angular resolution fan beams may be formed to persistently cover the FOV. For example, a set of M "horizontal" fan beams may be formed with differing beam angles using M columns of array antenna elements, while a set of N "vertical" fan beams may similarly be formed using N rows of array antenna elements. The fan beams may be formed by imposing a time delay on a received RF signal so the peak of the beam is at a specific angle. Summing the time delayed signals results in a fan beam.

Optionally in step 710, the data associated with each fan beam resulting from step 705 may be frequency channelized prior to cross-correlation. Conventional processing may be employed to divide the signal data into a series of non-overlapping frequency channels.

In step 715, each fan beam from the first set is cross-correlated with each fan beam from the intersecting set of fan beams. Cross-correlation may be accomplished directly on the summed data time series unique to each beam, or in I/Q data coordinate space. Cross-correlation may be performed, for each fan beam, by multiplying the data samples from intersecting fan beams at each common time and summing the result, according to the formula $C_{n,m}(\tau) = \langle P_n(t)P_m(t+\tau)\rangle_T$, where P is the power received in a fan beam. The result of the cross-correlation step 715 is a scalar of estimated average RF signal power being received at each intersection of each pair of fan beams. A map of power versus AoA in azimuth and elevation of the pencil beams can be created across the FOV. In essence, only common signals survive the cross-correlation, which nulls all received signal contributions present in the fan beams, except what is common at the intersection. If a channelization operation was performed in step 710, the cross-correlation operations of step 715 are performed not only for each fan beam pair, but also for each channel of the intersecting pairs of beams. This would yield, in addition to azimuth and elevation of the received signal(s), frequency information associated with the received signal(s). The output of the channelizer may be tested for content before proceeding with the cross-correlation and channels below a threshold power level may be set aside and not processed further The implementations advantageously use intersecting sub-apertures requiring fewer beamforming operations—proportional to the sum of the number of rows and columns—compared to the product of the number of rows and columns required to form beams using the full aperture. There is a tremendous gain in sensitivity compared to any element and a significant reduction in angular extent reducing interfering signals. Compared to any other sub-apertures one could construct, much better angular resolution is achieved. Compared to a full aperture beam, there may be some sacrifice of antenna sensitivity. But, in return, the implementations achieve lower data rates and lower required beamforming computations, i.e., the implementations require a fraction of the processing lanes, beamforming processing power and input/output at the antenna. That is, each antenna element may use one lane to apply one time delay appropriate to one AoA fan beam for a column or row, as opposed to each antenna element using one lane for every AoA pencil beam created by the full antenna. This could represent extensive savings in amounts of hardware and/or significant costs and/or power for the transport of signal data. For example, with reference to the 20×20 example array antenna described above, to form 400 beams of full angular resolution at higher sensitivity would require 10-20× more digital hardware at the antenna aperture. Further, transporting all of the digital data to a beamforming computer in such an antenna system would require more than 10-20× more data transport and I/O operations. If full data were to be sent to the beamforming compute, forming the 400 full aperture beams might require 20× more computations.

In step 720, the now correlated output power estimates may be compared to a threshold power, in order to filter out and/or rank detected RF signals received at the antenna. The intersecting beams are each at known azimuth and elevation (and frequencies, if applicable) so that a ranked list ranked power levels (and frequencies, if known) may then be used, in step 725, to cue additional beamforming in a focus mode. The additional beamforming may utilize the same array antenna just operated in the survey mode, but now using convention phased array beamforming techniques in a focused mode. In the focused mode, greater (perhaps even full) sensitivity may be achieved by directing additional beams (by properly time-shifting and adding additional rows and columns to coherently add in the cued direction) in the azimuth(s), elevation(s), and optionally frequencies, identified in the survey mode.

With reference to FIG. 8, RF signal detection method 800 provides improved RF signal detection. Intersecting sets of fan beams are formed in step 805 as described above. In step 810, however, the fan beam data may be triaged, by filtering out data time series that do not contain incident power above a predetermined threshold. The fan beam data remaining after this elimination step may be channelized into C channels. Channelization provides noise reduction and elimination of unwanted signals prior to correlating the power over the channels. The output of step 810 is, then, two sets of summed data time series, M'*C series in azimuth and N'*C series in elevation. In step 815, an additional triage operation may be performed, wherein channels below a threshold power are filtered out, thereby leaving the remaining fan beam data with less noise and interference.

In step 820, the data series for each remaining fan beam and channel from the first set of fan beams is cross-correlated with that of the remaining beams of the intersecting set of fan beams with power in the same channel. The result of this cross-correlation step 820 are M'*N'*C*F estimates of RF signal power detected at azimuths, elevations and frequency channels in the FOV, where F is the fraction of fan beams that passed the triage. In step 825, the now correlated output power estimates may be compared to a selected threshold power, in order to filter out and/or rank detected RF signals received at the antenna. The azimuth, elevation and frequency channel(s) of the ranked signals may then be used, in step 830, to cue additional beamforming in a focused mode, as described above.

With reference to FIG. 9, RF signal detection method 900 provides even greater RF signal detection at the expense of further data processing. Intersecting sets of fan beams are formed in step 905 as described above. In step 910, however, the fan beam data may similarly be triaged, by filtering out data time series that do not contain incident power above a predetermined threshold. A fast Fourier Transform (FFT) may be applied to the fan beam data remaining after the power filtering operation. This permits cross-correlation of each fan beam pair in frequency space rather than power spectral density operations. The output of step 910, then, may be sets of frequency coefficients for the remaining fan beams.

In step 915, an additional filtering process may be performed, wherein frequencies with frequency coefficients below a threshold level are filtered out, similarly eliminating extraneous noise and interference. In step 920, magnitudes are computed in frequency space by multiplying complex coefficients for the intersecting fan beam pairs. This results in a map of the total power at each remaining intersecting fan beam pair (i.e., pencil beam) direction within the frequency band of the Fourier transform. Correlations may be performed over channels of arbitrary size by varying the summation limits over FFT bands.

In step 925, the correlated output power estimates may be compared to a selected threshold power, in order to similarly filter out and/or rank the signals detected in azimuth, elevation and frequency channel. These data may similarly be used, in step 930, to cue additional beamforming in a focused mode, as described above.

Additional Implementations

Those of ordinary skill would readily appreciate that numerous variations in the described implementations may be possible. For example, as noted above, the intersecting fan beams may be formed by non-orthogonal array antennas. For non-orthogonal array antennas, the described signal processing methods would be substantially similar, but may prove less effective, due to signals in overlapping sidelobes of the respective non-orthogonal arrays.

In yet other implementations, a fewer number of fan beams may be formed to acceptably fill the FOV. It is not essential that each row and each column form an associated fan beam. In such implementations, a subarray (analog) comprising groups of rows or columns may be used to generate each fan beam prior to cross-correlation. Partial numbers of rows and/or columns may form more beams with larger angular extent. In yet other implementations, a row or column may form more than one fan beam at different peak angles, as opposed to the implementations described above wherein each set of fan beams may have a common peak angle (e.g., parallel with the boresight of the array antenna, etc.) Key digital beamforming parameters for designing such alternative antenna implementations would include, but not be limited to judicious selection of time delays and synchronizations that create relative phasing among the antenna elements of the arrays or subarrays, such that intersecting sets of fan beams may be formed and cross-correlated. Additional factors, as described above, may include the number of channels, the number of beams, signal bandwidth and data bandwidth to be employed in the RF antenna system being designed.

"Comprise," "include," and/or plural forms of each are open ended and include the listed parts and can include additional parts that are not listed. "And/or" is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. Method of detecting RF signals received from a field of view (FOV) using an array antenna having elements, said method comprising:
   receiving radiation, at a receiver associated with each element of the array antenna, the radiation coming from the FOV using a first fan beam plurality and a second fan beam plurality intersecting the first fan beam plurality to form a multitude of pencil-like beams at intersections, each of the fan beams originating from an associated column or row of antenna elements of the array antenna and pointing to a different angle in the FOV from its associated column or row with respect to the other fan beams in its respective fan beam plurality;
   cross-correlating, by a cross-correlator, signal power at the intersections of the received radiation from the first fan beam plurality and second fan beam plurality in the FOV to create correlated output power estimates; and
   using a comparator to compare the correlated output power estimates to a threshold power in order to rank RF signals detected in the radiation.

2. The method of claim 1, wherein intersecting portions of the first fan beam plurality and second fan beam plurality form a plurality of pencil beams persistently spanning the FOV.

3. The method of claim 2, wherein the plurality of pencil beams are formed with the full angular resolution of the array antenna.

4. The method of claim 2, wherein the first fan beam and the second fan beam are orthogonal.

5. The method of claim 1, further comprising estimating from the cross-correlation an amount of signal power present at the intersections of the first and second fan beam pluralities from one or more incident signals.

6. The method of claim 5, further comprising:
   cueing the formation of one or more beams of higher sensitivity than the intersecting first and second fan beam pluralities with the determined angle(s) of arrival of said one or more incident signals; and
   characterizing the one or more incident signals with the one or more higher sensitivity beams.

7. The method of claim 6, wherein the one or more beams of higher sensitivity are formed by the array antenna.

8. The method of claim 6, wherein cueing further comprises associating through at least one of ranking and filtering the estimates of incident signal power with a respective azimuth and elevation of each of the associated first and second fan beam pluralities intersections.

9. The method of claim 1, further comprising:
   eliminating prior to cross-correlation beams from the first fan beam plurality and second fan beam plurality containing power below a threshold power.

10. The method of claim 1, further comprising:
    prior to cross-correlation, channelizing the fan beams into frequency channels and selecting for cross-correlation the frequency channelized channels above a threshold power.

11. The method of claim 1, further comprising:
    prior to cross-correlation, applying a fast Fourier transform to the first and second fan beam pluralities, and selecting for cross-correlation frequencies with coefficients above a threshold; and
    wherein the cross-correlation is performed in frequency space by multiplying like complex coefficients.

12. The method of claim 1, wherein:
the FOV is hemispherical.

13. The method of claim 1, wherein at least one fan beam of the first fan beam plurality or the second fan beam plurality has a peak angle distinct from that of the other fan beams in its respective plurality.

14. The method of claim 1, wherein at least one of the first fan beam plurality and the second fan beam plurality comprises at least one fan beam formed from a subarray of multiple columns or of multiple rows, respectively.

15. The method of claim 1, wherein cross-correlating further comprises:
  initially determining whether intersecting portions of the first fan beam plurality and the second fan beam plurality indicates a potential incident signal;
  channelizing each of the fan beams into multiple frequency channels; and
  cross-correlating each like spectral band in order to identify in which the frequency channels signals are present.

16. Method of operating a digital beam-forming array antenna, comprising:
  in a survey mode, determining a respective angle of arrival of at least one incident signal using a plurality of persistent full bandwidth beams of full angular resolution formed by cross-correlation in a FOV by the array antenna, wherein the at least one incident signal has a signal power above a threshold power level; and
  in a full aperture focused mode, electronically steering one or more beams formed with the array antenna at the respective angle of arrival with a higher sensitivity than the persistent full bandwidth beams.

17. Method of claim 16, further comprising, in the survey mode, determining a presence of the at least one incident signal above a threshold power level.

18. The method of claim 16, wherein the array antenna comprises an orthogonal array antenna.

19. An apparatus for detecting RF signals received from a field of view (FOV), comprising:
  an array antenna for receiving radiation from a field of view (FOV) comprised of a plurality of columns of array elements orthogonal to a plurality of rows of the array elements for forming at least a first fan beam plurality and a second fan beam plurality intersecting the first fan beam plurality, each of the fan beams formed from one or more associated column or row and pointing to a different angle from its associated one or more columns or rows with respect to the other fan beams in its respective fan beam plurality to form a multitude of pencil-like beams at intersections;
  a receiver for cross-correlating components of said received radiation; and
  a signal processing lane for processing the components in order to rank incident signals of interest.

20. The apparatus of claim 19, further including a processor for measuring cross-correlation output at the intersection of the fan beam pluralities in order to determine an angle of arrival of one or more incident signals.

21. The apparatus of claim 19, wherein the array antenna comprises an orthogonal array antenna.

22. The apparatus of claim 19, wherein the signal processing lane applies a particular digital time delay for a specific beam direction being created.

* * * * *